INVENTOR
Solomon Zaromb

United States Patent Office 3,332,804
Patented July 25, 1967

3,332,804
RESERVE BATTERY AND ASSOCIATED ACTIVATION MEANS
Solomon Zaromb, 376 Monroe St., Passaic, N.J. 07055
Filed Aug. 10, 1964, Ser. No. 388,431
19 Claims. (Cl. 136—90)

This invention relates to an improved electrochemical reserve battery and the battery activation means associated therewith.

It is an object of my invention to provide an improved reserve battery having an exceptionally high energy to volume ratio.

It is also an object of this invention to provide a reserve battery having a high energy to weigh ratio.

It is still another object of my invention to provide a reserve battery which can be rapidly activated.

It is yet another object of my invention to provide an activation means which is simple and reliable.

It is yet another object of my invention to minimize the weight and size of said activation mechanism.

In present commercial reserve batteries the electrolyte is kept in a separate compartment prior to activation, and a rather complex activation mechanism is required to force the electrolyte rapidly into the electrode compartments to activate a battery. This necessitates a battery volume larger than twice the volume of the total electrolyte.

My invention consists in having the electrolyte contained within each battery cell at all times, and in preventing premature electrochemical action by having the electrodes protected from the electrolyte by chemically inactive removable covering foils. Activation of the battery is then effected through instantaneous withdrawal of said removable foils.

My invention may be best explained with reference to the drawing, in which.

Figure 3:
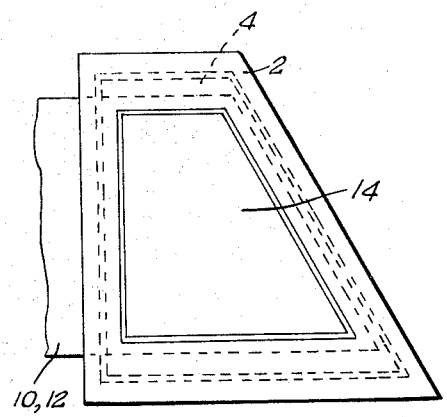
FIG. 3 is a diagrammatic vertical view of a single radial cell compartment in the embodiment of FIG. 1.

Each radial cell compartment of FIG. 3 is enclosed by a sealing gasket 2 made of plastic material such as rubber or tetrafluoroethylene polymer and by two thin foils 10, 12 covering the anode side 6 and the cathode side 8 of bipolar electrodes 4. Said compartment may be filled either directly with electrolyte or with a porous absorbent material, such as parchment paper, soaked with electrolyte 14. Foils 10, 12 and electrodes 4 are preferably of flat shape. Foils 10, 12 may be made of plastic material such as non-porous tetrafluoroethylene polymer, or of metals which are inactive in electrolyte 14. For instance, in alkaline electrolytes, said metals may consist of Ag, Au, Pt or possibly even Ni. Foils 10, 12 are welded onto, wedged into or otherwise firmly affixed to a central shaft 16 which may be actuated by a spring 18 or by an electric relay or motor (not shown).

The edges of electrodes 4 and foils 10, 12 are compressed by sealing gaskets 2 to prevent seepage of electrolyte. The seams between said foils and gaskets may also be filled with vaseline or other grease-like or jelly-like electrolyte repellent substance 20 capable of preventing seepage of electrolyte around the cell edges and of facilitating withdrawal of said foils by its lubricating properties. The battery is activated by rotation of central shaft 16 with respect to said radial cell compartments until all said foils are withdrawn from said compartments. Said rotation may be effected almost instantaneously by the release of a wound spring 18 (which may be under tension or torsion) or by the action of an electric motor or relay.

The battery pile is completed by the terminal anode and cathode strips 22 and 24 separated by an insulating spacer 26 which may be made of tetrafluoroethylene polymer or other suitable material.

The electrode and electrolyte composition may be the same as in other conventional or novel reserve batteries. For instance, cathodes 8 may comprise silver oxide, anodes 6 may comprise chiefly zinc, and electrolyte 14 may be an aqueous solution containing at least 3 moles per liter NaOH or KOH, preferably between 6 and 10 moles per liter of KOH.

Alternately, anodes 6 may consist of Al, Mg or alloys of Al with Zn, Mg, Hg and/or other suitable additives, the advantages of such alloys lying in their relatively high energy content per unit battery weight or volume.

Figure 1:
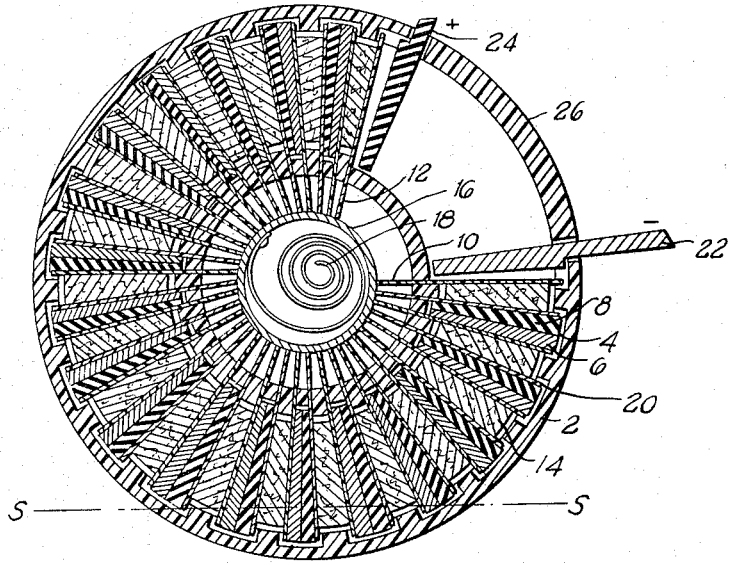
FIG. 1 is a diagrammatic view of a horizontal section of one embodiment of my invention.
Figure 2:
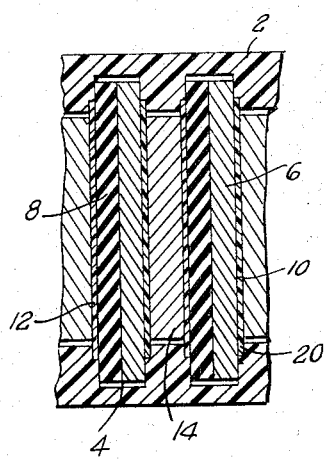
FIG. 2 is a diagrammatic partial view of a vertical cross-section along line S—S of FIG. 1.

In the afore-described embodiment, the trapezoidal radial cell compartments of FIG. 3 when disposed around shaft 16 as in FIG. 1 result in an overall battery configuration resembling a frustrum of a cone. In other embodiments, however, the radial cell compartments may be square, rectangular, triangular, polygonal, circular, elliptical or of other convenient planar shape, so as to yield an overall configuration resembling a section of a round or polygonal cylinder, double cone, pyramid or bi-pyramid, sphere, ellipsoid or other nearly round or symmetrical body.

In still another embodiment, foils 10 and 12 may be affixed to a lateral or horizontal plate, sheet or rod abutting aaginst one side of a battery or battery pile having its cell compartments in parallel rather than in radial alignment. Withdrawal of the foils may then be effected by pulling said plate, rod or sheet away from said cell compartments by releasing a distended spring or by actuating an electric relay.

In either of the afore-going embodiments, the weight and volume of the removable foils and associated rod and spring or equivalent withdrawing means are small compared with the total weight and volume of such essential battery components as electrolyte 14 and of electrodes 4. My invention thus permits appreciable reductions in the weight and volume of existing reserve batteries.

There will now be obvious to those skilled in the art many variations and modifications of the afore-described embodiments. However, these variations and modifications will not depart from the scope of my invention if defined by the following claims.

I claim:

1. An electrochemical reserve battery comprising a series of bipolar electrodes which are activated upon contact with electrolyte and electrochemically inactive removable foils separating said electrodes from said electrolyte before activation.

2. Reserve battery as claimed in claim 1 wherein said electrodes are disposed along approximately radial directions with respect to a central axis.

3. Reserve battery as claimed in claim 2 wherein said inactive foils are firmly affixed to a central shaft situated in the vicinity of said central axis.

4. Reserve battery as claimed in claim 3 comprising means for withdrawing said inactive foils from the vicinity of said electrodes by turning or twisting said central shaft.

5. A battery as claimed in claim 1 wherein said electrodes and foils are essentially flat segments.

6. A battery as claimed in claim 5 wherein the seams around said essentially flat segments are insulated from said electrolyte by means of plastic gaskets.

7. A battery as claimed in claim 6 wherein said seams are also permeated with a grease-like electrolyte-repellent substance.

8. A battery as claimed in claim 1 comprising porous material soaked with electrolyte in the compartments between said bi-polar electrodes.

9. A battery as claimed in claim 1 wherein said electrolyte contains at least 3 moles per liter of an alkali metal hydroxide.

10. A battery as claimed in claim 9 wherein said electrolyte contains between 6 and 10 moles per liter of KOH.

11. A battery as claimed in claim 1 wherein said bi-polar electrodes comprise silver oxide cathodes.

12. A battery as claimed in claim 1 wherein said bi-polar electrodes comprise anodes containing an electrochemically active divalent metal.

13. A battery as claimed in claim 1 wherein said anodes contain aluminum.

14. A battery as claimed in claim 1 wherein said removable foils are made of a metal which is chemically inactive in said electrolyte.

15. A battery as claimed in claim 1 wherein said foils are affixed to a solid element abutting against a side of said battery.

16. A battery as claimed in claim 15 comprising means for withdrawing said foils from the vicinity of said electrodes by pulling on said solid element.

17. A battery as claimed in claim 1 comprising a releasable spring mechanism for removing said inactive foils from the vicinity of said electrodes.

18. A battery as claimed in claim 1 comprising an electrochemical mechanism for removing said inactive foils from the vicinity of said electrodes.

19. A battery as claimed in claim 1 wherein said foils are made of a chemically inactive plastic.

References Cited

UNITED STATES PATENTS

| | | | |
|---|---|---|---|
| 515,432 | 1/1894 | Hubbell | 136—113 |
| 541,350 | 6/1895 | Glasgow | 136—113 |
| 3,228,801 | 1/1966 | Snyder | 136—90 X |

WINSTON A. DOUGLAS, *Primary Examiner.*

D. L. WALTON, *Assistant Examiner.*